(12) United States Patent
Chen et al.

(10) Patent No.: US 10,917,514 B1
(45) Date of Patent: Feb. 9, 2021

(54) METHOD AND APPARATUS FOR ACTIVATING NEAR FIELD COMMUNICATION CARD

(71) Applicant: BEIJING XIAOMI MOBILE SOFTWARE CO., LTD., Beijing (CN)

(72) Inventors: Shan Chen, Beijing (CN); Mengshan Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/695,078

(22) Filed: Nov. 25, 2019

(30) Foreign Application Priority Data

Sep. 5, 2019 (CN) .......................... 2019 1 0838259

(51) Int. Cl.
*H04M 1/725* (2006.01)
*H04L 29/08* (2006.01)
*H04W 4/80* (2018.01)
*H04W 4/021* (2018.01)

(52) U.S. Cl.
CPC ........ *H04M 1/72572* (2013.01); *H04L 67/18* (2013.01); *H04L 67/22* (2013.01); *H04W 4/021* (2013.01); *H04W 4/80* (2018.02)

(58) Field of Classification Search
CPC ......... H04M 1/72572; H04M 1/72569; H04M 1/72577; H04W 4/80; H04W 4/021; H04W 12/00405; H04W 12/00504; H04W 12/00508; H04W 12/08; H04W 4/60; H04W 76/14; H04W 12/06; H04W 4/02; H04L 67/18; H04L 67/22; H04L 63/00; H04L 63/107; H04L 29/06; H04B 5/00

USPC .......................................................... 455/418
See application file for complete search history.

(56) References Cited

U.S. PATENT DOCUMENTS

| 9,805,370 | B1 * | 10/2017 | Quigley ................. H04W 4/021 |
| 2011/0281558 | A1 * | 11/2011 | Winter .................. H04W 12/08 455/411 |
| 2011/0307891 | A1 * | 12/2011 | Orr ........................ G06F 1/3215 718/100 |

(Continued)

FOREIGN PATENT DOCUMENTS

| CN | 105472534 A | 4/2016 |
| CN | 109255269 A | 1/2019 |

(Continued)

OTHER PUBLICATIONS

Extended European Search Report of EP Application No. 20150960.1 dated Jun. 17, 2020.

(Continued)

*Primary Examiner* — Nathan S Taylor
(74) *Attorney, Agent, or Firm* — Syncoda LLC; Feng Ma

(57) ABSTRACT

A method and apparatus for activating a Near Field Communication (NFC) card involving short range communication can the problems of low efficiency and poor user experience in the process of switching and managing the emulated card. The method includes: determining and activating an NFC card associated with a preset location change rule in response to detecting that a change of a geographic location conforms to the preset location change rule, where the preset location change rule is used to characterize entering and/or leaving a preset geographic range.

10 Claims, 9 Drawing Sheets

(56) References Cited

U.S. PATENT DOCUMENTS

| | | | |
|---|---|---|---|
| 2012/0172027 A1* | 7/2012 | Partheesh | H04L 12/2816 455/420 |
| 2013/0084798 A1* | 4/2013 | Faithorn | H04W 76/14 455/41.1 |
| 2013/0331029 A1* | 12/2013 | Tang | H04W 4/60 455/41.1 |
| 2013/0339166 A1 | 12/2013 | Baer et al. | |
| 2014/0370910 A1* | 12/2014 | Natucci, Jr. | H04W 4/021 455/456.1 |
| 2015/0020160 A1* | 1/2015 | Goncalves | G06Q 20/3227 726/3 |
| 2015/0052534 A1 | 2/2015 | Wang et al. | |
| 2016/0142531 A1* | 5/2016 | Marti | G06F 8/00 455/418 |
| 2016/0192407 A1* | 6/2016 | Fyfe | H04W 84/18 370/328 |
| 2016/0198295 A1* | 7/2016 | Jeon | H04W 4/021 455/456.3 |
| 2019/0149652 A1* | 5/2019 | Rodriguez Bravo | H04W 4/021 455/418 |
| 2020/0015034 A1* | 1/2020 | Ahn | H04W 4/021 |
| 2020/0058013 A1* | 2/2020 | Carter | H04W 4/021 |

FOREIGN PATENT DOCUMENTS

| | | | | |
|---|---|---|---|---|
| CN | 109257071 A | 1/2019 | | |
| CN | 110069955 A | 7/2019 | | |
| EP | 2626823 A1 * | 8/2013 | | G06Q 20/3574 |
| WO | 2015103787 A1 | 7/2015 | | |
| WO | 2019050449 A1 | 3/2019 | | |

OTHER PUBLICATIONS

CN Office Action in Application No. 201910838259.6, dated Aug. 18, 2020.

* cited by examiner

METHOD AND APPARATUS FOR ACTIVATING NEAR FIELD COMMUNICATION CARD

CROSS-REFERENCE TO RELATED APPLICATION

This application claims priority to Chinese Patent Application No. 201910838259.6 filed on Sep. 5, 2019, the disclosure of which is hereby incorporated by reference in its entirety.

BACKGROUND

There are often multiple emulated cards configured on a smart watch, a mobile phone and other terminals, and each of the cards corresponds to a different application scenario (such as a bus card, an attendance card, an electronic key of a door lock, etc.). In actual use, the user needs to activate the corresponding emulated card according to the application scenario, and the card may be activated by the user's manual operation or may be determined to be activated automatically by the terminal.

SUMMARY

The present disclosure relates generally to the short-range communication technology, and more specifically to a method and apparatus for activating a Near Field Communication (referred to as NFC) card.

According to a first aspect of embodiments of the present disclosure, there is provided a method for activating a Near Field Communication card, including:
  detecting a geographical location of a user; and
  in response to detecting that a change of the geographic location conforms to a preset location change rule, determining and activating an NFC card associated with the preset location change rule,
  wherein the preset location change rule is configured to characterize entering and/or leaving a preset geographic range.

In an implementation, the step of determining and activating, in response to detecting that a change of the geographic location conforms to a preset location change rule, a Near Field Communication (NFC) card associated with the preset location change rule includes:
  in response to monitoring that the change of the geographic location is entering the preset geographic range from an outside of the preset geographic range, determining and activating the NFC card associated with the preset location change rule corresponding to entering the preset geographic range; and
  in response to monitoring that the change of the geographic location is leaving the preset geographic range from an inside of the preset geographic range, determining and activating the NFC card associated with the preset location change rule corresponding to leaving the preset geographic range;
  wherein the preset geographic range is any one of at least one geographic range that is preset.

In an implementation, before determining the NFC card associated with the preset location change rule, the method further includes:
  determining a current time period; and
  determining the NFC card associated with the preset location change rule in a manner of:
    determining the NFC card associated with the preset position change rule corresponding to the current time period.

In an implementation, the method further includes:
  collecting a plurality of historical motion trajectories of a same user;
  extracting at least one key geographic location point from the historical motion trajectories; and
  determining the preset geographic range and determining an association relationship between the preset location change rule and the NFC card according to the extracted at least one key geographical location point.

In an implementation, the step of determining the preset geographic range and determining an association relationship between the preset location change rule and the NFC card according to the extracted at least one key geographical location point includes:
  outputting information of the at least one key geographical location point;
  receiving a configuration instruction that is fed back by the user for the output information, the at least one key geographical location point and a geographic range corresponding to each of the key geographical location points being indicated in the configuration instruction;
  determining, according to the configuration instruction, a corresponding geographic range for the indicated key geographic location point;
  receiving an association instruction that is fed back by the user for each indicated key geographic location point, an association relationship between the location change rule characterized by entering and/or leaving the geographic range corresponding to the key geographic location point and the corresponding NFC card to be activated being indicated in the association instruction; and
  associating the corresponding NFC card with the indicated location change rule according to the association instruction.

In an implementation, the step of determining the preset geographic range according to the extracted at least one key geographical location point, and determining an association relationship between the preset location change rule and the NFC card includes:
  determining, from the extracted at least one key geographical location point, the key geographical location point that needs to use the NFC card according to a history record of using the NFC card by the user;
  determining, for each of the key geographical location points on different motion trajectories that need to use the NFC card, card information of the corresponding NFC card to be used at a next geographic location point to be arrived after leaving the geographic range corresponding to the key geographical location point according to an order of arrival of the key geographical location points that need to use the NFC card on the motion trajectories, and determining the NFC card corresponding to the determined card information as the NFC card associated with the location change rule characterized by leaving the geographic range corresponding to the key geographical location point; and/or
  determining, for each of the key geographic location points on the different motion trajectories that need to use the NFC card, the card information of the corresponding NFC card to be used at the key geographic location point, and determining the NFC card corresponding to the determined card information as the NFC card associated with the location change rule characterized by entering the geographic range corresponding to the key geographic location point.

In an implementation, the step of detecting the geographical location of the user includes:
triggering the detection according to an activity feature of the user and/or a preset time feature, and obtaining information of a geographic location in which the user is currently located; and
determining a change of the geographical location of the user according to the information of the geographical location obtained last time and the information of the geographical location obtained this time.

According to a second aspect of the embodiments of the present disclosure, there is provided an apparatus for activating a Near Field Communication card, including:
a motion detection module configured to detect a geographic location of a user; and
a card matching and activating module configured to, in response to detecting that a change of the geographical location conforms to a preset location change rule, determine and activate a Near Field Communication (NFC) card associated with the preset location change rule,
wherein the preset location change rule is configured to characterize entering and/or leaving a preset geographic range.

In an implementation, the card matching and activating module includes:
a first activating module configured to, in response to monitoring that the change of the geographic location is entering the preset geographic range from an outside of the preset geographic range, determine and activate the NFC card associated with the preset location change rule corresponding to entering the preset geographic range; and
a second activating module configured to, in response to monitoring that the change of the geographic location is leaving the preset geographic range from an inside of the preset geographic range, determine and activate the NFC card associated with the preset location change rule corresponding to leaving the preset geographic range,
wherein the preset geographic range is any one of at least one geographic range that is preset.

In an implementation, the apparatus further includes a time determination module,
the time determination module is configured to determine a current time period,
the card matching and activating module is configured to determine the NFC card associated with the preset location change rule corresponding to the current time period.

In an implementation, the apparatus further includes:
a historical data collection module configured to collect a plurality of historical motion trajectories of a same user;
a key location extraction module configured to extract at least one key geographic location point from the historical motion trajectories; and
an association relationship setting module configured to determine the preset geographic range and determine an association relationship between the preset location change rule and the NFC card according to the extracted at least one key geographic location point.

In an implementation, the association relationship setting module includes:

an output module configured to output information of the at least one key geographic location point;
a configuration instruction receiving module configured to receive a configuration instruction that is fed back by the user for the output information, the at least one key geographical location point and a geographic range corresponding to each key geographical location points being indicated in the configuration instruction;
a geographic range setting module configured to determine a corresponding geographic range for the indicated key geographic location point according to the configuration instruction;
an association instruction receiving module configured to receive an association instruction that is fed back by the user for each indicated key geographic location point, an association relationship between the location change rule characterized by entering and/or leaving the geographic range corresponding to the key geographic location point and the corresponding NFC card to be activated being indicated in the association instruction; and
an association card setting module configured to associate the corresponding NFC card with the indicated position change rule according to the association instruction.

In an implementation, the association relationship setting module includes:
a usage history analyzing module configured to determine the key geographic location point that needs to use the NFC card from the extracted at least one key geographic location point according to a history record of using the NFC card by the user;
a first associated card setting module configured to determine, for each of the key geographical location points on the different motion trajectories that need to use the NFC card, card information of the corresponding NFC card to be used at a next geographic location point to be arrived after leaving the geographic range corresponding to the key geographic location point according to an order of arrival of the key geographic location points that need to use the NFC card on the motion trajectories, and determine the NFC card corresponding to the determined card information as the NFC card associated with the location change rule characterized by leaving the geographic range corresponding to the key geographical location point;
a second associated card setting module configured to determine, for each of the key geographic location points on different motion trajectories that need to use NFC card, the card information of the corresponding NFC card to be used at the key geographic location point, and determine the NFC card corresponding to the determined card information as the NFC card associated with the location change rule characterized by entering the geographic range corresponding to the key geographic location point.

In an implementation, the motion detection module includes:
a trigger detection module configured to trigger the detection according to an activity feature of the user and/or a preset time feature and obtain information of a geographic location in which the user is currently located; and
a result comparison module configured to determine a change of the geographic location of the user according to the information of the geographic location obtained last time and the information of the geographic location obtained this time.

According to a third aspect of the embodiments of the present disclosure, there is provided a computer apparatus, including:
  a processor; and
  a memory for storing instructions executable by the processor;
  wherein the processor is configured to:
  detect a geographical location of a user; and
  in response to detecting that a change of the geographic location conforms to a preset location change rule, determine and activate a Near Field Communication (NFC) card associated with the preset location change rule,
  wherein the preset location change rule is configured to characterize entering and/or leaving a preset geographic range.

According to a fourth aspect of the embodiments of the present disclosure, there is provided a non-transitory computer-readable storage medium having stored therein instructions that, when executed by a processor of a mobile terminal, causes the mobile terminal to perform a method for activating a Near Field Communication card, the method comprising:
  detecting a geographical location of a user; and
  in response to detecting that a change of the geographic location conforms to a preset location change rule, determining and activating a Near Field Communication (NFC) card associated with the preset location change rule,
  wherein the preset location change rule is configured to characterize entering and/or leaving a preset geographic range.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
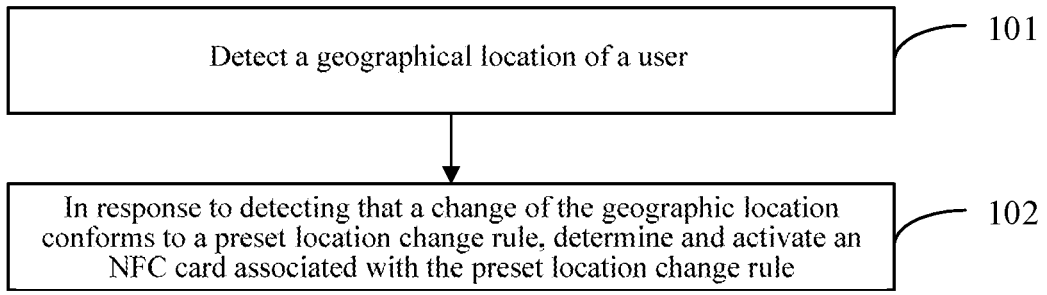
FIG. 1 is a flowchart showing a method for activating a Near Field Communication card, according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A process for manually activating an NFC card can include:
  1) manually waking up a device;
  2) launching an application for managing the emulated card in the device;
  3) displaying a list of the emulated cards stored in the NFC chip of the terminal by the application, and finding a target card in the list by the user;
  4) performing an operation on the target card by the user so that the target card is activated and switched to a readable state; and
  5) waiting for success of the activation and then using the card.

The approach of automatically determining the activation of the NFC card by the terminal needs to integrate information of card-reading device in the emulated card, such as identity information of the card-reading device, geographical location information of the card-reading device, and so on. When using the card, the terminal is put close to the card reading device such as a gate that can read the NFC card, and an automatic determination and activation program is triggered to determine identity information of the gate, compare it with the information of the card reading device in the emulated card, and activate the matched emulated card to the readable state.

For management of switching and activating multiple NFC cards in the same terminal, the manual activation process takes ten seconds to several tens of seconds, and requires the user to perform multiple steps of the manual operations, which is cumbersome to use.

In the automatic determination and activation approach, the process of matching and activating the emulated card is started after entering the working range of the card-swiping device (for example, contacting the card-swiping device), which takes a long time. Due to limitation of the environment in which the card reading device is located, such as a subway gate, the underground mobile signal coverage is poor, the GPS signal is weak, and the required geographic location information and the like may not be read in time, resulting in a long activation process or even a failed activation, which affects the user's usage.

As such, both the manual activation approach and the approach of the automatic determination and activation by the terminal have problems of inefficiency and poor user experience.

In order to solve the above problem, the embodiments of the present disclosure provide a method and apparatus for activating a Near Field Communication card, which automatically recognizes a card that needs to be activated and automatically completes activation according to the user's motion trajectory.

Some embodiments of the present disclosure provide a method for activating a Near Field Communication card. The process for performing automatic switching and activation of multiple emulated cards by using the method is as shown in FIG. 1, which includes the following steps.

In step 101, a user's geographic location is detected.

In this step, the user's geographic location may be detected by a terminal having a positioning function, such as a smart watch, a smart phone or the like, and the detection includes detection of a real-time geographic location and/or a motion trajectory to obtain a change in the geographic location of the user.

In step 102, in response to detection that the change of the geographical location conforms to a preset location change rule, an NFC card associated with the preset location change rule is determined and activated.

In the embodiments of the present disclosure, a plurality of location change rules for different geographic ranges may be preset, and the preset location change rules are used to characterize entering and/or leaving a preset geographic range. A plurality of NFC cards may be configured on the client, each of the location change rules is associated with an NFC card, and each of the NFC cards is associated with at least one location change rule.

In this step, when the detected change of the geographical location of the user conforms to the preset location change rule, the NFC card associated with the location change rule is determined and activated, and the automatic selection and activation of the NFC card are completed.

In an embodiment of the present disclosure, the NFC card may be used in various scenarios, such as an access card, a bus card, a subway card, an attendance card, or the like.

The embodiments of the present disclosure provide a method and apparatus for activating a Near Field Communication card, in which by detecting a geographic location of a user and when it is detected that a change in the geographic location conforms to a preset location change rule characterizing entry into a preset geographic range and/or leaving the preset geographic range, the Near Field Communication (NFC) card associated with the preset position change rule is determined and activated. Compared with the manual activation and the automatic determination and activation by the terminal in the related art, it is not required to perform the cumbersome activation step by manually activating, and the activation is performed until the user enters the working range of the card swiping device, but the activation may be triggered upon entering and/or leaving the preset geographic range, which not only completes the automatic selection and activation of the NFC card, but also solves the problem of inefficiency and poor user experience in the switching and management process of the emulated card.

Figure 2:
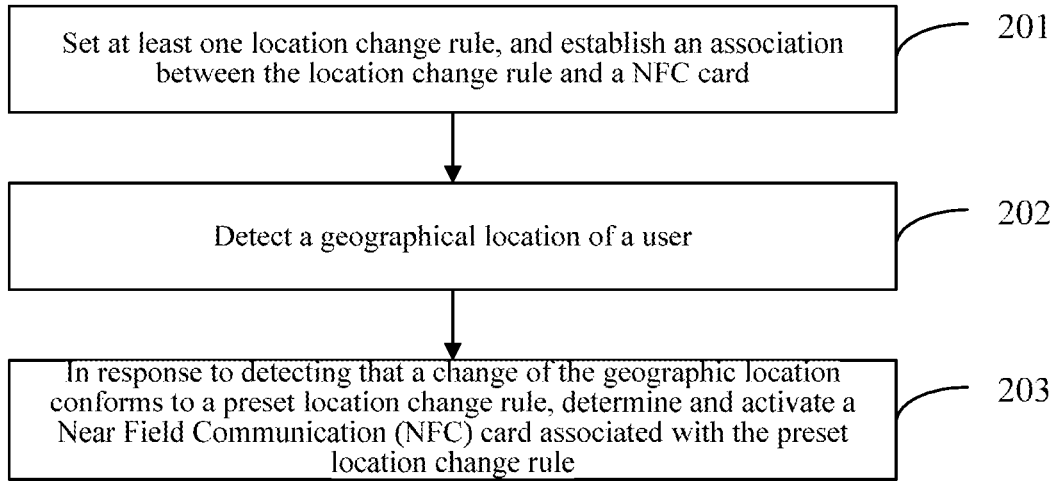
FIG. 2 is a flowchart showing a method for activating a Near Field Communication card, according to some embodiments.

Some embodiments of the present disclosure further provide a method for activating a Near Field Communication card. The process for performing automatic activation of the NFC card using the method is as shown in FIG. 2, which includes the following steps.

In step 201, at least one location change rule is set, and an association between the location change rule and the NFC card is established.

In this step, at least one location change rule is preset, and the location change rule is used to characterize entering and/or leaving a preset geographic range. A plurality of NFC cards may be configured on the client, each of the location change rules is associated with the NFC card, and each of the NFC cards is associated with at least one location change rule.

In an embodiment, the location change rule may further include a time condition, which may be one or more time points, or may be one or more time periods. The location change rule may be further used to characterize entering into and/or leaving the preset geographic range under the time condition, and may also be used to characterize being within the time condition.

The step 201 may be set in advance, and may be triggered to be performed according to a setting indication of the user, and it is not needed to be performed each time before the performance of step 202.

Figure 3:
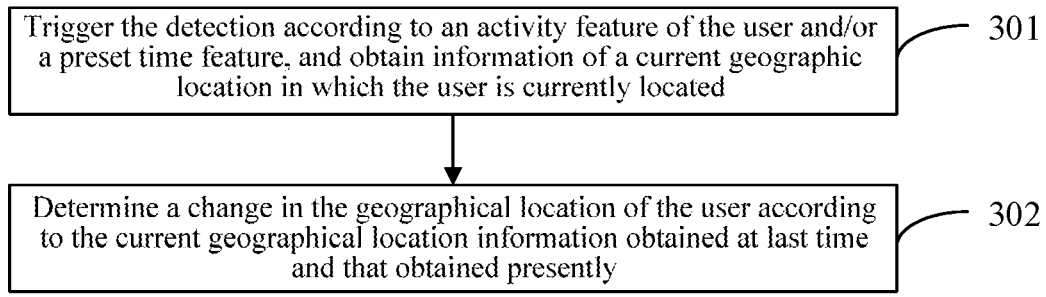
FIG. 3 is a flowchart showing detection of a geographic location of a user, according to some embodiments.

In step 202, a geographic location of the user is detected. This step is as shown in FIG. 3 and includes the following steps.

In step 301, the detection is triggered according to an activity feature of the user and/or a preset time feature, and information of a geographic location in which the user is currently located is obtained.

In the embodiments of the present disclosure, the geographic location of the user needs to be detected so as to obtain the change in the geographic location of the user, thereby triggering switching and activation of the NFC card. There are the following two manners.

In a first manner: the detection is triggered according to the activity feature of the user, and the current geographical location information of the user is obtained. The activity feature of the user may be a distance moved in a plane (for example, a plane distance of continuous movement more than 100 meters, or continuously walking for 100 steps and the plane distance of the movement more than 50 meters), and when the activity feature occurs, a positioning component such as a Global Positioning System (GPS) sensor or the like may be started to locate the mobile terminal and determine the information of the geographic location in which the user is currently located.

Since the user is active, a direction of motion may be determined based on the direction in which the user moves so as to facilitate determining the change in the geographic location of the user.

In a second manner, the detection is triggered according to a preset time feature of the user, and information of the geographic location where the user is currently located is obtained. For example, a periodic detection is used as the time feature, and the current geographic location information of the user is periodically obtained according to the preset detection period; and then the motion direction is determined according to the current geographical location information obtained at last time and that obtained presently. The detection period may be configured according to the user's usage habits. Prolonging the detection period appropriately is beneficial to save electric energy, and shortening the detection period appropriately is beneficial to improve a response speed of the automatic detection.

In step 302, a change in the geographic location of the user is determined according to the current geographic location information obtained at last time and that obtained presently.

When the geographical location information detected in two adjacent detections (for example, detected currently and previously) indicates that the user has moved, the change of the geographic location of the user may be determined according to the two adjacent geographical location information. In another embodiment, a distance threshold may also be configured, and the geographic location of the user may be determined to be changed when the distance between the geographical location information detected in two adjacent detections reaches the distance threshold.

In step 203, in response to detecting that the change of the geographic location conforms to the preset location change rule, a Near Field Communication (NFC) card associated with the preset location change rule is determined and activated.

In the embodiments of the present disclosure, the preset location change rule may be used to characterize the entry into the preset geographic range. In response to monitoring that the change of the geographic location is entering the preset geographic range from outside the preset geographic range, the NFC card associated with the preset location change rule corresponding to the entry into the preset geographic range is determined and activated. That is, if the detected change of the geographical position of the user is entering the preset geographic range from outside of the preset geographic range, it is determined that the geographic location change of the user conforms to the location change rule corresponding to entering the preset geographic range, thereby the NFC card associated with this location change rule is selected and activated. For example, the attendance card is activated when entering a geographic range corresponding to a company.

The preset location change rule may also be used to characterize the leaving from the preset geographic range. In response to monitoring that the change of the geographic location is leaving the preset geographic range from inside of the preset geographic range, the NFC card associated with the preset location change rule corresponding to the leaving from the preset geographic range is determined and activated. That is, if the detected change of the geographical position of the user is leaving the preset geographical range from inside of the preset geographical range, it is determined that the geographical location change of the user conforms to the location change rule corresponding to leaving the preset geographical range, thereby the NFC card associated with this location change rule is selected and activated. For example, a subway card is activated when leaving a geographic range corresponding to "home".

The preset geographic range is any of at least one geographical range set in advance.

In addition, before or after detecting that the change of the geographical location conforms to the preset location change rule, the method may further include the following steps.

In step 1, a current time period is determined.

In the step 1, in addition to determining the current geographical location information, a current time may also be obtained to determine the current time period. The preset location change rule may further include a time condition. In this case, it is required to obtain information related to the current time period so as to determine whether the preset location change rule is met.

For the case where the current time period is determined before the detection, the respective preset location change rules may be set separately for different time periods, and after determining the current time period, the current geographical location change may be compared with the preset location change rule corresponding to the current time period. For the case where the current time period is determined after the detection, in response to detecting that the geographical position change conforms to the preset location change rule and the same preset location change rule is set in different time periods, the current time period may be determined so as to determine an accurate NFC card.

It should be noted that the step 1 is an optional step, which may be enabled or disabled by the user as a system function item in the terminal device, or may be automatically enabled when the user sets the preset location change rule with the time condition.

In another embodiment of the present disclosure, before determining the Near Field Communication (NFC) card associated with the preset location change rule, the method may further include: determining a current time period.

Then, the NFC card associated with the preset location change rule may be determined in the following manner:

determining an NFC card associated with the preset location change rule corresponding to the current time period.

For the case where the user moves back and forth on the same motion trajectory, or the case where the user moves on different motion trajectories on different dates, the corresponding NFC cards may be associated with the preset position change rules corresponding to the different time periods.

Taking the case where the user moves back and forth on the same motion trajectory as an example, it is assumed that the user's commute route is a motion trajectory of the user's round trip on the working day. The motion trajectory for the user to commute to work may include a trajectory from home to the subway station and then to the company, and the motion trajectory for the user to commute from work is reversed, which may include a trajectory from the company to the subway station and then to home. Then, the preset location change rule for leaving the preset geographical range corresponding to the subway station may be associated with either the company's NFC card or the home NFC card.

If it is desired to associate this preset geographic range with the two NFC cards, it may be set by time period, that is, due to different time periods for commuting to and from work, the preset location change rule of leaving the preset geographical range corresponding to the subway station during the commuting-to-work period may be associated with the company's NFC card, and the preset location change rule of leaving the preset geographical range corresponding to the subway station during the commuting-from-work period may be associated with the home NFC card. That is, after monitoring that the change of the geographical position of the user conforms to the preset location change rule, the current time period may be determined because different time periods may correspond to the same preset location change rule, and the same preset location change rule may be associated with different NFC cards. Therefore, by determining the current time period, the truly corresponding preset position change rule can be determined from the same preset position change rule, thereby determining the correct NFC card and performing the activation.

Taking the case whether the user moves on the different motion trajectories on different dates as an example, it is assumed that the user's trajectory is from home to company during a certain time period in the morning of the working day, and is from home to library during the certain time period in the morning on the weekend. The preset location change rule for leaving the preset geographical position corresponding to the subway station may be associated with either the company's NFC card, or the library's NFC card. Similarly, after monitoring that the change of the user's geographic location conforms to the preset location change rule, the current time period of the current date may be determined, thereby determining the NFC card associated with the preset position change rule corresponding to the current time period of the current date, which is not elaborated here.

Figure 4:
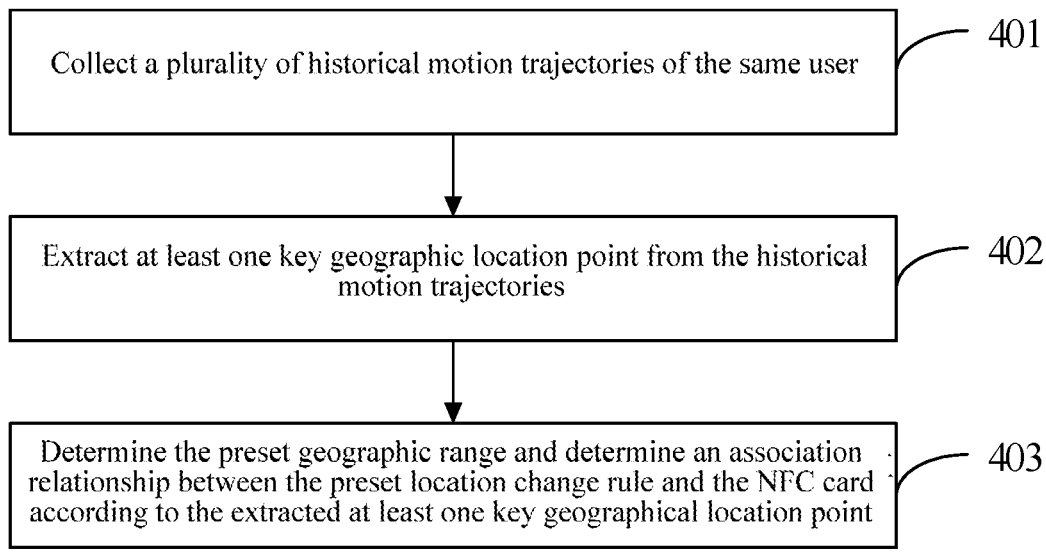
FIG. 4 is a flowchart showing a method for activating a Near Field Communication card, according to some embodiments.

Some embodiments of the present disclosure further provide a method for activating a Near Field Communication card. The process of setting at least one location change rule and establishing an association between the location change rule and the NFC card by using the method is as shown in FIG. 4, including the following steps.

In step 401, a plurality of historical motion trajectories of the same user is collected.

In this step, the plurality of historical motion trajectories of the same user are collected by a mobile terminal having positioning and data collecting functions, such as a mobile phone, a smart watch, a smart bracelet, or the like. In one embodiment, the collected motion trajectories may be classified according to the activity time. For example, the motion trajectories from 7:00 to 9:30 a.m. are classified into one category (which may be related to a work route), the motion trajectories on Saturday are classified into another category (which may be related to leisure activities), and so on. Corresponding key geographical location points, the geographic range corresponding to the key geographical location points, and the association relationship between the location change rules of the preset geographic ranges corresponding to different categories of motion trajectories and the corresponding NFC cards may be respectively determined according to different categories of motion trajectories.

In step 402, at least one key geographical location point is extracted from the historical motion trajectories.

In the embodiments of the present disclosure, the key geographical location points may be some specific key geographical location points which are preset, or popular or functional sites such as a subway station, a bus station, an office building, a library, etc. In one embodiment, the key location points may include sites where the NFC card may be used. When analyzing the user's historical motion trajectories, these key geographical location points are automatically identified for the user to quickly select the geographic range to be set. The information of the preset key geographical location points may be downloaded to the mobile terminal in advance and updated continuously in subsequent usage; or may be configured in the cloud server, the mobile terminal uploads the collected historical motion trajectories to the cloud server, and the cloud server extracts the key geographical location points therefrom and returns relevant information to the mobile terminal.

In step 403, the preset geographic range is determined according to the extracted at least one key geographical location point, and an association relationship between the preset location change rule and the NFC card is determined.

In this step, the information of the key geographical location point may be output for reference by the user, and the setting of the geographic range and the associated NFC card are completed according to the configuration instruction fed back by the user; or a setting rule may be configured in the system, and the setting of the geographical range and the associated NFC card may be completed automatically according to the setting rule.

Figure 5:
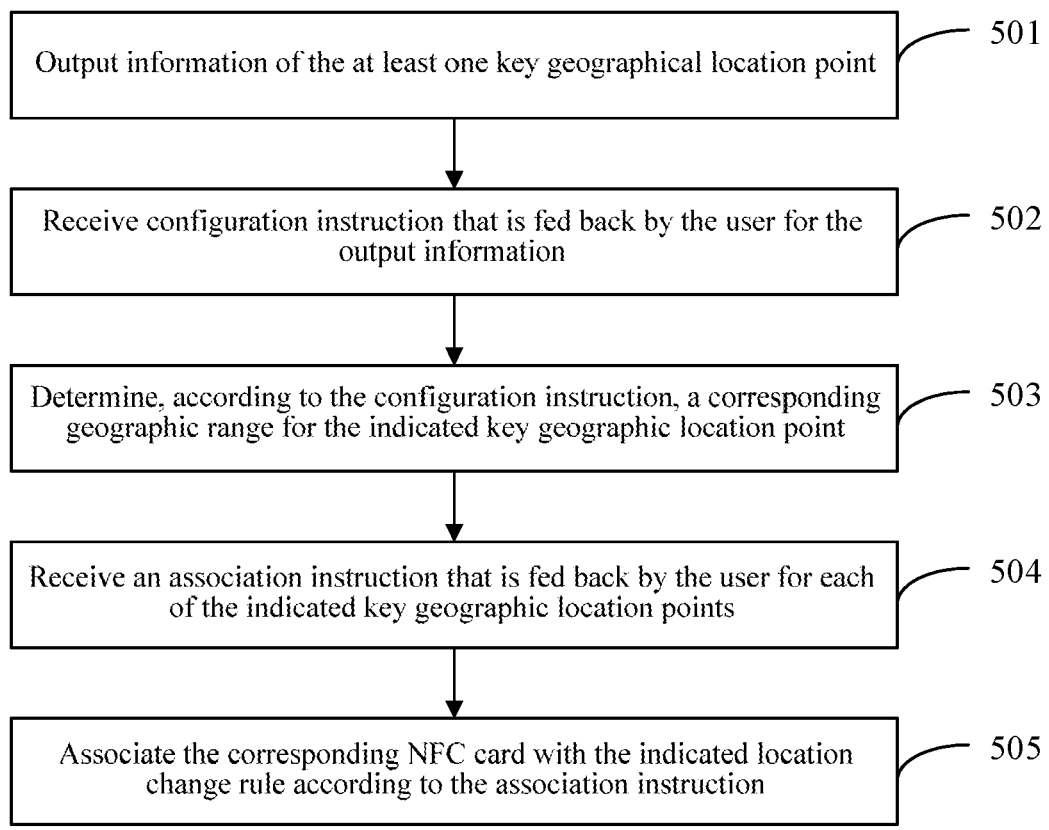
FIG. 5 is a flowchart showing a method for setting a geographic range and an associated NFC card in accordance with a configuration instruction fed back by the user, according to some embodiments.

The process of setting the geographic range and the associated NFC card according to the configuration instruction fed back by the user is as shown in FIG. 5, including the following steps.

In step 501, information of at least one key geographical location point is output.

In this step, some or all of the information of the associated geographic location points extracted are outputted, and may be directly presented by the mobile terminal, or may be sent to the user's mobile phone or the like and presented by the application program. It may be presented on a display screen of the terminal such as mobile phone in the form of a list for users to view.

The user may select some or all of the key geographical location points therefrom and configure the corresponding geographical range for each of the key geographical location point. For example, a circle with a radius of 50 meters centered on the key geographical location point on map page is the corresponding geographical range. In an embodiment, if an area covered by the key geographical location point is large, the center may be set on a central point or other points of the area covered by the key geographical location point, or a position of the NFC card swiping device corresponding to the key geographical location point. When the center is set on the position of the NFC card swiping device corresponding to the key geographical location point, the set geographical range may be larger than a range in which the card swiping device can sense, that is, a working range of the card swiping device.

After completing the configuration, the user sends a configuration instruction to the mobile terminal, and the configuration instruction indicates at least one key geographical location point and a geographical range corresponding to each of the key geographical location points.

In step 502, the configuration instruction fed back by the user for the output information is received, at least one key geographical location point and the geographic range corresponding to each of the geographical location key points of being indicated in the configuration instruction.

In step 503, a corresponding geographic range for the indicated key geographical location point is determined according to the configuration instruction.

In this step, after the configuration instruction is received, the corresponding geographical range may be determined for the indicated key geographical location point according to the key geographical location point and the corresponding geographical range thereof indicated in the configuration instruction.

In the embodiments of the present disclosure, the geographical range may be a standard geometry such as a perfect circle, a square or the like, or may be a closed or unclosed geographical region drawn by the user. For example, north of the North Third Ring Road is an unclosed geographical region.

In step 504, an association instruction that is fed back by the user for each of the indicated key geographical location points is received, where the association relationship between the location change rules characterized by entering or leaving the geographic ranges corresponding to the respective key geographical location points and the corresponding NFC cards to be activated is indicated in the association instruction.

In step 505, the corresponding NFC card is associated with the indicated location change rule according to the association instruction.

In this step, after the geographical range is determined, the location change rule may also be formed according to the association instruction sent by the user, and an association relationship between the location change rule and the NFC card is established. In general case, one NFC card may correspond to multiple application scenarios, and thus one NFC card may be associated with one or more location change rules; while one location change rule is associated with one NFC card.

Figure 6:
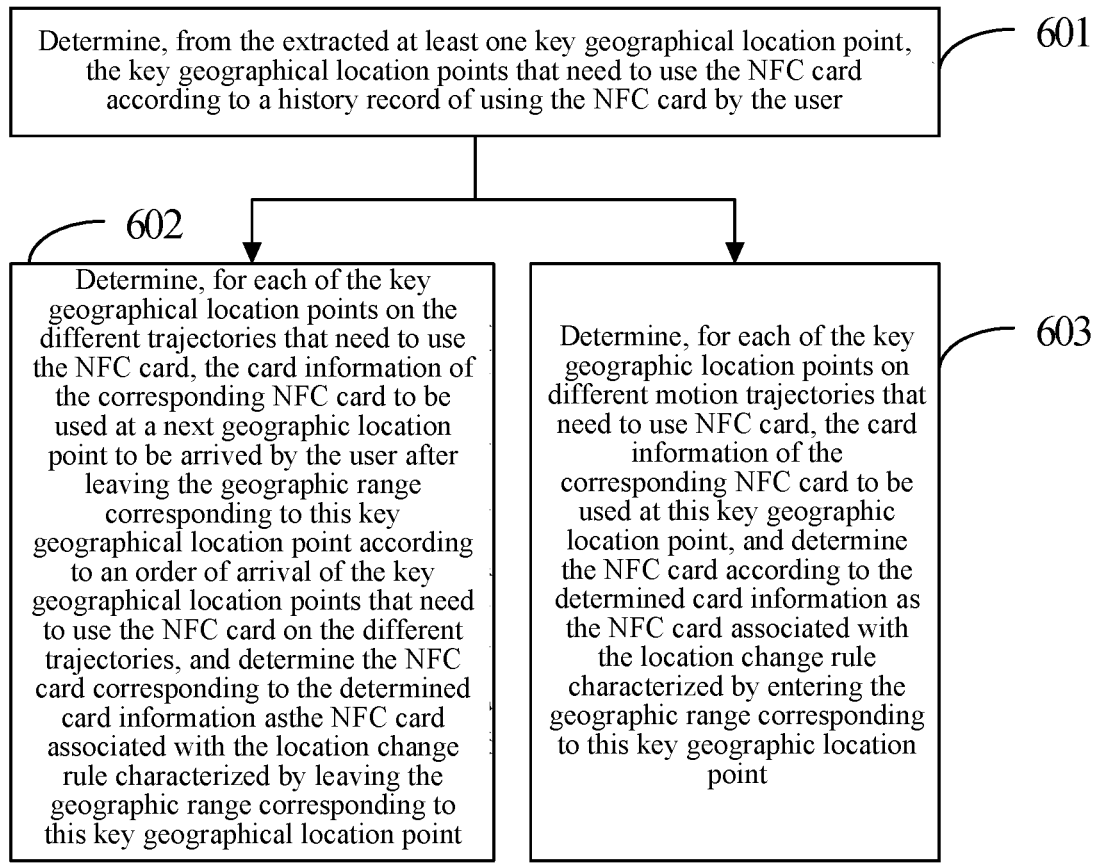
FIG. 6 is a flowchart showing a method for automatically setting the geographic range and the associated NFC card by the system, according to some embodiments.

In another embodiment, the process of setting the geographic range and the associated NFC card automatically performed by the system is as shown in FIG. 6, including the following steps.

In step 601, the key geographical location point that needs to use the NFC card is determined from the extracted at least one key geographical location point according to a history record of using the NFC card by the user.

In step 602, for each of the key geographical location points on the different trajectories that need to use the NFC card, the card information of the corresponding NFC card to be used at a next geographic location point to be arrived after leaving the geographic range corresponding to this key geographical location point is determined according to an order of arrival of the key geographical location points that need to use the NFC card on the different trajectories, and the NFC card corresponding to the determined card information is determined as the NFC card associated with the location change rule characterized by leaving the geographic range corresponding to this key geographical location point.

In this step, for the motion trajectory of commuting to work, it can identify that the key geographic location points on this motion trajectory that need to use NFC card includes: home, the subway station, and the company. The arrival order of these key geographic locations on this commuting trajectory is: home, the subway station, and then the company. With respect to the key geographical location point of home, the card information of the corresponding NFC card to be used at the next arriving geographic location point, that is, the subway station, after leaving the geographical range corresponding to home may be determined, and the corresponding NFC card to be used at the subway station may be determined as the NFC card which is associated with the location change rule characterized by leaving the geographical range corresponding to home.

In step 603, for each of the key geographic location points on different motion trajectories that need to use NFC card, the card information of the corresponding NFC card to be used at this key geographic location point is determined, and the NFC card corresponding to the determined card information is determined as the NFC card associated with the location change rule characterized by entering the geographic range corresponding to this key geographical location point.

In this step, for the motion trajectory of commuting from work, it can identify that the key geographic location points on this motion trajectory that need to use NFC card includes: the company, the subway station, and home. The arrival order of these key geographic locations on this commuting trajectory is: the company, the subway station, and the home. With respect to the key geographic location point of home, the card information of the corresponding NFC card to be used at home may be determined, and the NFC card to be used at home corresponding to the determined card information may be determined as the NFC card which is associated with the location change rule characterized by entering the geographical range corresponding to home.

In the above steps, for the same NFC card, the user can associate it with the location change rule of leaving a certain geographical range, or associate it with the location change rule of entering a certain geographical range according to their own convenience settings. For example, the metro card may be set to be associated with the location change rule of leaving the geographical range corresponding to home, or with the location change rule of entering the geographical range corresponding to the subway station, which is not limited by the present disclosure.

In this embodiment, in the process of collecting and analyzing the user's motion track, it can be found that there are different motion trajectories for different time periods on different days, for example, the motion trajectories for commuting-to-work periods on working days, for commuting-off-work period on working days, and for leisure and going out periods on weekends. When collecting and filtering the motion trajectories, the user's usual motion trajectories may be selected. Therefore, there may be multiple different types of motion trajectories. The steps of determining the key geographical locations for the different types of motion trajectories and determining the NFC cards associated with the geographical ranges corresponding to the key geographical locations may be performed respectively.

It should be noted that there is no strict timing relationship for step 602 and step 603 and they may be applied individually or commonly to generate the association relationship between the location change rule and the NFC card. The step 602 or step 603 may be set as a separate function item of the system's functions, and the user may enable or disable the configuration manner of the association relationship provided by the step 602 or step 603 by turning on or off this function item.

Figure 7:
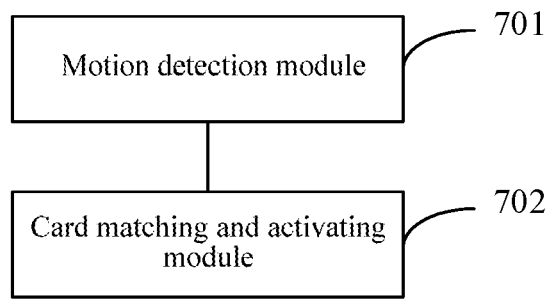
FIG. 7 is a block diagram illustrating an apparatus for activating a Near Field Communication card, according to some embodiments.

Some embodiments of the present disclosure further provide an apparatus for activating a Near Field Communication card, the structure of which is shown in FIG. 7, including:

a motion detection module 701 which is configured to detect a geographic location of a user; and a card matching and activating module 702 which is configured to determine and activate the Near Field Communication (NFC) card associated with a preset location change rule in response to detecting that a change of the geographical location conforms to the preset location change rule;

where the preset location change rule is used to characterize entering and/or leaving a preset geographic range.

Figure 8:
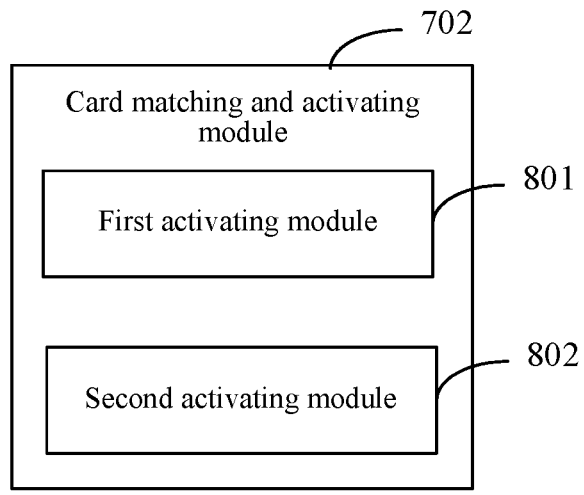
FIG. 8 is a structural block diagram illustrating a card matching and activating module 702, according to some embodiments.

In one embodiment, a structure of the card matching and activating module 702 is shown in FIG. 8, including:

a first activating module 801 which is configured to determine and activate, in response to monitoring that the change of the geographic location is entering the preset geographic range from outside the preset geographic range, the NFC card associated with the preset location change rule corresponding to entering into the preset geographic range; and a second activating module 802 which is configured to determine and activate, in response to monitoring that the change of the geographic location is leaving the preset geographic range from within the preset geographic range, the NFC card associated with the preset location change rule corresponding to leaving the preset geographic range;

where the preset geographic range is any one of at least one geographic range that is set in advance.

Figure 9:
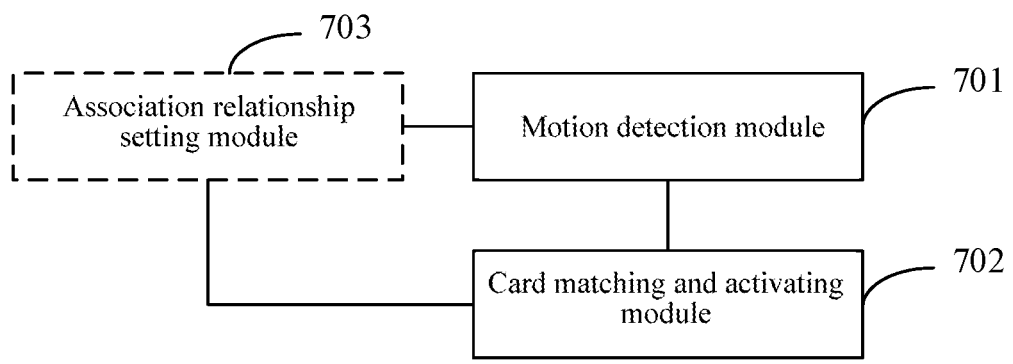
FIG. 9 is a block diagram illustrating an apparatus for activating a Near Field Communication card, according to some embodiments.

In one embodiment, the structure of the apparatus is shown in FIG. 9, and further includes:

a time determination module 703 which is configured to determine a current time period; and the card matching and activating module 702 is configured to determine the NFC card associated with the preset location change rule corresponding to the current time period.

Figure 10:
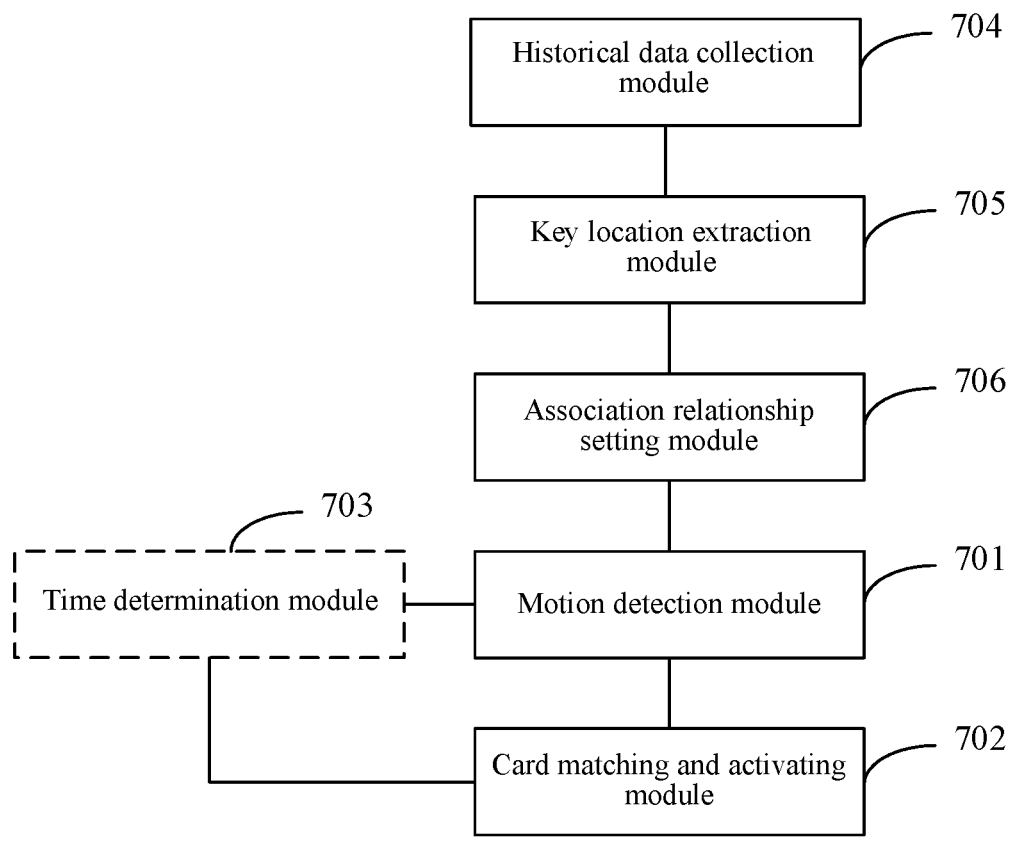
FIG. 10 is a block diagram illustrating an apparatus for activating a Near Field Communication card, according to some embodiments.

In one embodiment, the structure of the device is shown in FIG. 10, and further includes:

a historical data collection module 704 which is configured to collect multiple historical motion trajectories of the same user;

a key location extraction module 705 which is configured to extract at least one key geographic location point from the historical motion trajectories; and an association relationship setting module 706 which is configured to determine the preset geographic range and the association relationship between the preset location change rule and the NFC card according to the at least one key geographic location point extracted.

Figure 11:
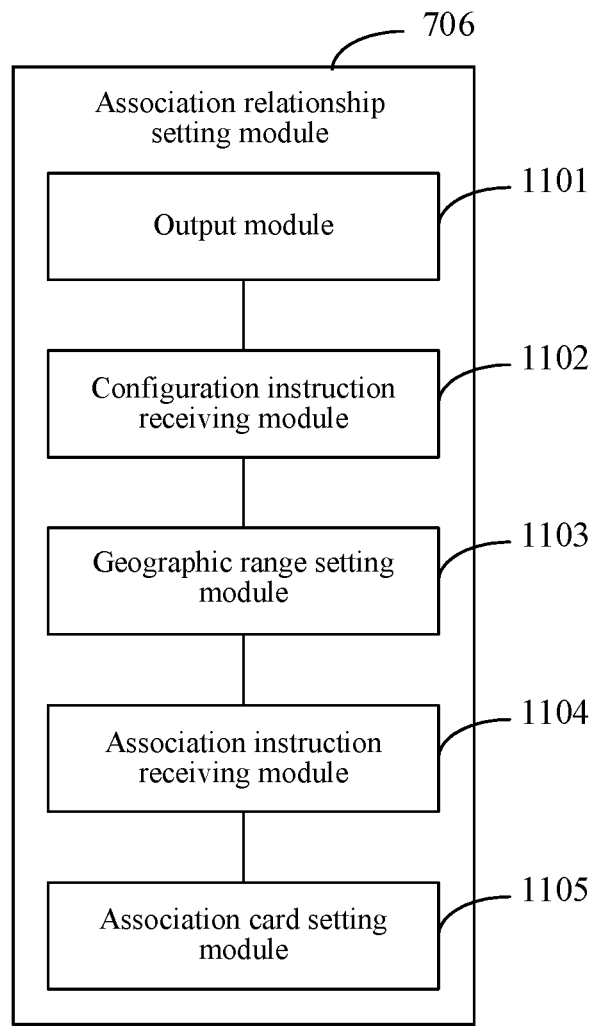
FIG. 11 is a structural block diagram illustrating an association relationship setting module 705, according to some embodiments.

In one embodiment, the structure of the association relationship setting module 706 is shown in FIG. 11, and includes:

an output module 1101 which is configured to output information of the at least one key geographic location point;

a configuration instruction receiving module 1102 which is configured to receive a configuration instruction fed back by the user for the information output, in which the at least one key geographic location point and a geographic range corresponding to each of the key geographic location points are indicated;

A geographic range setting module 1103 which is configured to determine the corresponding geographic range for the indicated key geographic location point according to the configuration instruction;

An association instruction receiving module 1104 which is configured to receive an association instruction fed back by the user for each of the indicated key geographic location points, in which the association relationship between the location change rule characterized by entering and/or leaving the geographic range corresponding to the key geographic location point and the corresponding NFC card to be activated are indicated; and an association card setting module 1105 which is configured to associate the corresponding NFC card with the indicated position change rule according to the association instruction.

Figure 12:
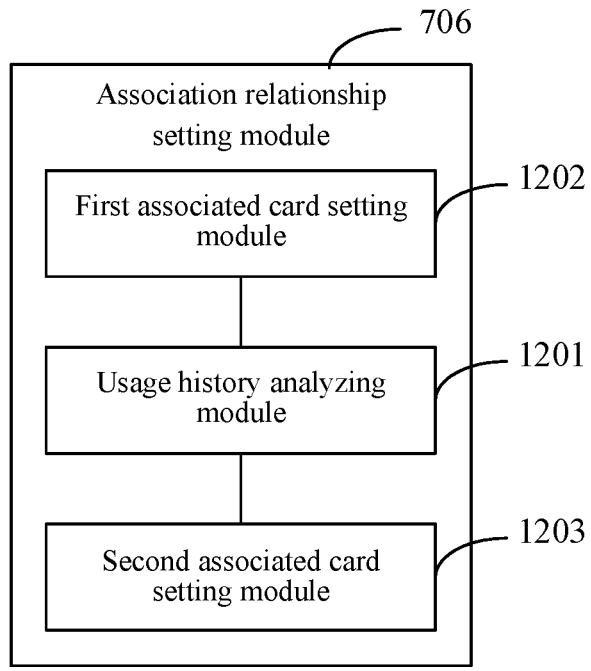
FIG. 12 is a structural block diagram illustrating an association relationship setting module, according to some embodiments.

In one embodiment, the structure of the association relationship setting module 706 is shown in FIG. 12, an includes:

a usage history analyzing module 1201 which is configured to determine the key geographic location point that needs to use the NFC card from the extracted at least one key geographic location point according to according to a history record of using the NFC card by the user;

a first associated card setting module 1202 which is configured to determine, for each of the key geographical location points on the different motion trajectories that need to use the NFC card, card information of the corresponding NFC card to be used at a next geographic location point to be arrived after leaving the geographic range corresponding to the key geographic location point according to an order of arrival of the key geographic location points that need to use the NFC card on the motion trajectories, and determine the NFC card corresponding to the determined card information as the NFC card associated with the location change rule characterized by leaving the geographic range corresponding to this key geographical location point;

a second associated card setting module 1203 which is configured to determine, for each of the key geographic location points on different motion trajectories that need to use NFC card, the card information of the corresponding NFC card to be used at this key geographic location point, and determine the NFC card corresponding to the determined card information as the NFC card associated with the location change rule characterized by entering the geographic range corresponding to this key geographic location point.

Figure 13:
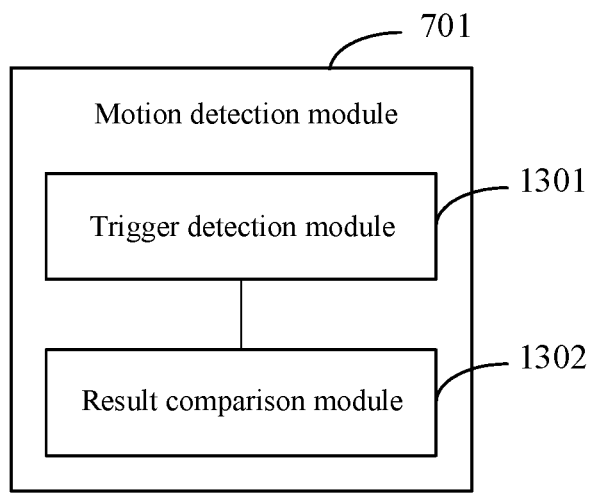
FIG. 13 is a structural block diagram illustrating a motion detecting module 701, according to some embodiments.

In one embodiment, the structure of the motion detection module 701 is shown in FIG. 13, and includes:

a trigger detection module 1301 which is configured to trigger detection according to an activity feature of the user and/or a preset time feature to obtain information of a current geographic location in which the user is currently located;

a result comparison module 1302 which is configured to determine a change of the geographic location of the user according to the geographic location information obtained at last time and that obtained presently.

With respect to the apparatuses in the above embodiments, the manners for performing operations for individual modules therein have been described in detail in the embodiments regarding the methods, which will not be elaborated herein. The above apparatus may be integrated into wearable devices such as smart watches, smart bracelets, or the like, or may be integrated into personal smart mobile terminals with positioning functions such as smart phones or the like, and the corresponding functions are realized by the terminals.

Some embodiments of the present disclosure further provide a computer apparatus, including:

a processor; and a memory for storing instructions executable by the processor;

where the processor is configured to:

detect a geographical location of a user;

in response to detecting that a change of the geographic location conforms to a preset location change rule, determine and activate a Near Field Communication (NFC) card associated with the preset location change rule;

where the preset location change rule is used to characterize entering and/or leaving a preset geographic range.

Figure 14:
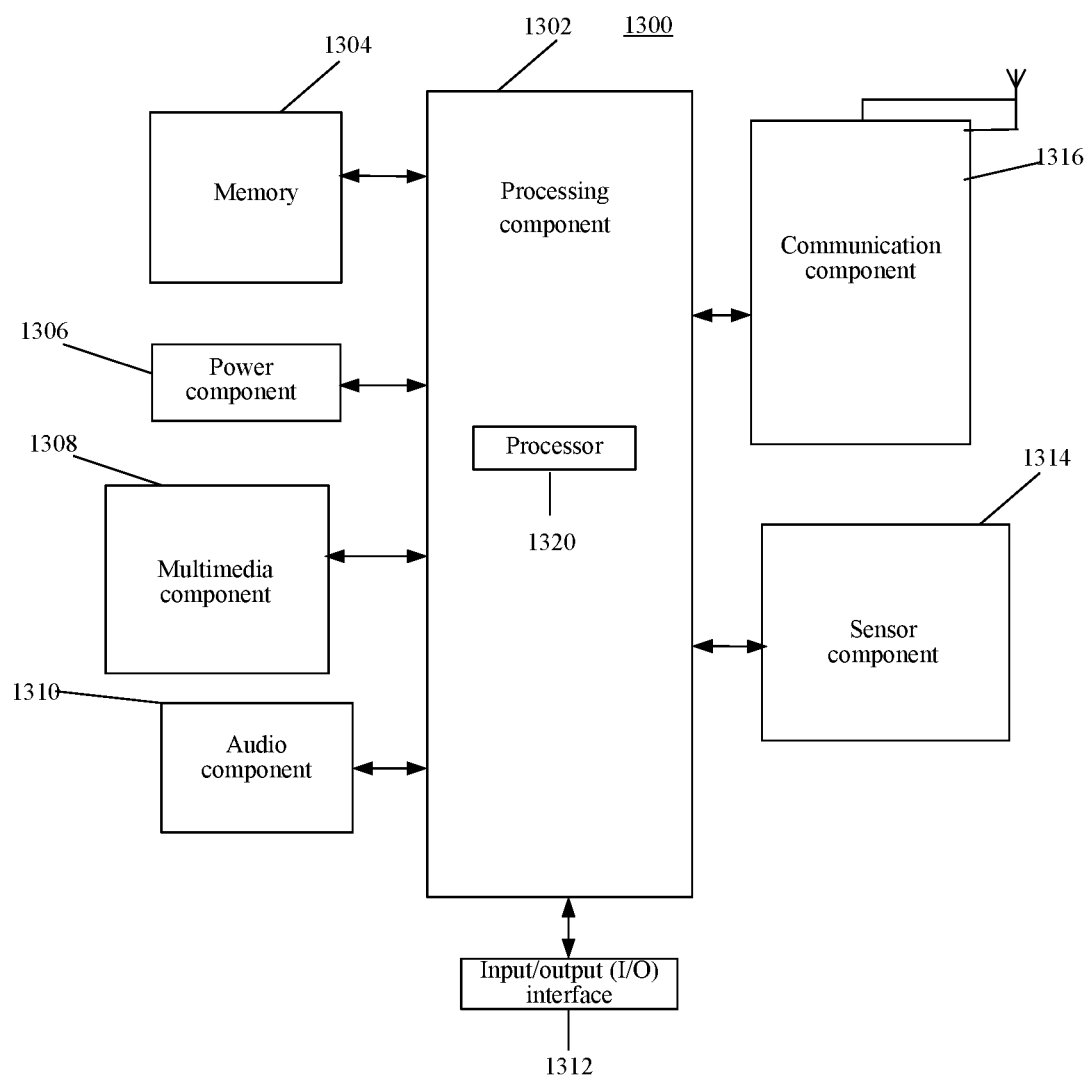
FIG. 14 is a block diagram illustrating an apparatus, according to some embodiments (a general structure of a mobile terminal).

FIG. 14 is a block diagram of an apparatus (or device) 1400 for activating a Near Field Communication card, according to some embodiments. For example, the apparatus 1400 may be any apparatus or device capable of integrating NFC function and being used as a virtual NFC card, such as a wearable device (for example, a smart watch, a smart bracelet, and so on), a mobile phone, a tablet computer, a computer, a digital broadcast terminal, a messaging device, a gaming console, a tablet, a medical device, exercise equipment, a personal digital assistant, and the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The various device components, circuits, modules, units, blocks, or portions may have modular configurations, or are composed of discrete components, but nonetheless may be referred to as "modules" in general. In other words, the "components," "circuits," "modules," "units," "blocks," or "portions" referred to herein may or may not be in modular forms.

The memory 1404 is configured to store various types of data to support the operation of the device 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the device 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as Wi-Fi, 2G, 3G, 4G, or 5G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the apparatus 1400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium including instructions which, when executed by a processor in a mobile terminal, cause the mobile terminal to perform a method for activating a Near Field Communication card, the method including:

detecting a geographical location of a user;
　　in response to detecting that a change of the geographic location conforms to a preset location change rule, determining and activating a Near Field Communication NFC card associated with the preset location change rule;
　　where the preset location change rule is used to characterize entering and/or leaving a preset geographic range.

Various embodiments of the present disclosure therefore can provide a method and apparatus for activating a Near Field Communication card with one or more of the following advantages. A user's geographic location is detected, and the NFC card associated with the preset location change rule is determined and activated in response to detecting that the change of the geographic location conforms to the preset location change rule characterizing entering and/or leaving the preset geographic range. According to the change of the user's geographical location, a prediction of scenario in which the NFC card is used is realized, and on this basis, the automatic NFC card switching and activation is carried out, which solves the problems of low efficiency and poor user experience in the NFC card activation approach.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for activating a Near Field Communication (NFC) card, comprising:
   detecting a geographical location of a user; and
   in response to detecting that a change of the geographic location conforms to a preset location change rule, determining and activating, among a plurality of NFC cards of the user each associated with at least one location change rule, an NFC card associated with the preset location change rule,
   wherein the preset location change rule is configured to characterize at least one of entering and leaving a preset geographic range;
   the method further comprising:
   collecting a plurality of historical motion trajectories of a same user;
   extracting at least one key geographic location point from the historical motion trajectories; and
   determining the preset geographic range and determining an association relationship between the preset location change rule and the NFC card according to the extracted at least one key geographical location point;
   wherein the determining the preset geographic range and determining the association relationship between the preset location change rule and the NFC card according to the extracted at least one key geographical location point comprises:
   outputting information of the at least one key geographical location point;
   receiving a configuration instruction that is fed back by the user for the output information, the at least one key geographical location point and a geographic range corresponding to each key geographical location point being indicated in the configuration instruction;
   determining, according to the configuration instruction, a corresponding geographic range for the indicated key geographic location point;
   receiving an association instruction that is fed back by the user for each indicated key geographic location point, an association relationship between the location change rule characterized by at least one of entering and leaving the geographic range corresponding to the key geographic location point and the corresponding NFC card to be activated being indicated in the association instruction; and
   associating the corresponding NFC card with the indicated location change rule according to the association instruction; or
   wherein the determining the preset geographic range and determining the association relationship between the preset location change rule and the NFC card according to the extracted at least one key geographical location point comprises at least one of:
   determining, from the extracted at least one key geographical location point, the key geographical location point that needs to use the NFC card according to a history record of using the NFC card by the user;
   determining, for each of the key geographical location points on different motion trajectories that need to use the NFC card, card information of the corresponding NFC card to be used at a next geographic location point to be arrived after leaving the geographic range corresponding to the key geographical location point according to an order of arrival of the key geographical location points that need to use the NFC card on the motion trajectories, and determining the NFC card corresponding to the determined card information as the NFC card associated with the location change rule characterized by leaving the geographic range corresponding to the key geographical location point; and
   determining, for each of the key geographic location points on the different motion trajectories that need to use the NFC card, the card information of the corresponding NFC card to be used at the key geographic location point, and determining the NFC card corresponding to the determined card information as the NFC card associated with the location change rule characterized by entering the geographic range corresponding to the key geographic location point.

2. The method for activating a Near Field Communication card of claim 1, wherein the in response to detecting that the change of the geographic location conforms to the preset location change rule, determining and activating the Near Field Communication (NFC) card associated with the preset location change rule comprises:
   in response to monitoring that the change of the geographic location is entering the preset geographic range from an outside of the preset geographic range, determining and activating the NFC card associated with the preset location change rule corresponding to entering the preset geographic range; and
   in response to monitoring that the change of the geographic location is leaving the preset geographic range from an inside of the preset geographic range, determining and activating the NFC card associated with the preset location change rule corresponding to leaving the preset geographic range;
   wherein the preset geographic range is any one of at least one geographic range that is preset.

3. The method for activating a Near Field Communication card of claim 2, wherein the detecting the geographical location of the user comprises:
   triggering the detection according to at least one of an activity feature of the user and a preset time feature, and obtaining information of a geographic location in which the user is currently located; and
   determining a change of the geographical location of the user according to the information of the geographical location obtained in a previous detection and the information of the geographical location obtained in a present detection.

4. The method for activating a Near Field Communication card of claim 1, wherein before determining the NFC card associated with the preset location change rule, the method further comprises:
   determining a current time period; and
   determining the NFC card associated with the preset location change rule in a manner of:

determining the NFC card associated with the preset position change rule corresponding to the current time period.

5. The method for activating a Near Field Communication card of claim 1, wherein the detecting the geographical location of the user comprises:
triggering the detection according to at least one of an activity feature of the user and a preset time feature, and obtaining information of a geographic location in which the user is currently located; and
determining a change of the geographical location of the user according to the information of the geographical location obtained in a previous detection and the information of the geographical location obtained in a present detection.

6. A computer apparatus, comprising:
a processor; and
memory for storing instructions executable by the processor;
wherein the processor is configured to:
detect a geographical location of a user; and
in response to detecting that a change of the geographic location conforms to a preset location change rule, determine and activate, among a plurality of Near Field Communication (NFC) cards of the user each associated with at least one location change rule, an NFC card associated with the preset location change rule,
wherein the preset location change rule is configured to characterize at least one of entering and leaving a preset geographic range;
wherein the processor is further configured to:
collect a plurality of historical motion trajectories of a same user;
extract at least one key geographic location point from the historical motion trajectories; and
determine the preset geographic range and determine an association relationship between the preset location change rule and the NFC card according to the extracted at least one key geographic location point;
wherein the processor is further configured to:
output information of the at least one key geographic location point;
receive a configuration instruction that is fed back by the user for the output information, the at least one key geographical location point and a geographic range corresponding to each key geographical location points being indicated in the configuration instruction;
determine a corresponding geographic range for the indicated key geographic location point according to the configuration instruction;
receive an association instruction that is fed back by the user for each indicated key geographic location point, an association relationship between the location change rule characterized by at least one of entering and leaving the geographic range corresponding to the key geographic location point and the corresponding NFC card to be activated being indicated in the association instruction; and
associate the corresponding NFC card with the indicated position change rule according to the association instruction; or
wherein the processor is further configured to:
output information of the at least one key geographic location point;
receive a configuration instruction that is fed back by the user for the output information, the at least one key geographical location point and a geographic range corresponding to each key geographical location points being indicated in the configuration instruction;
determine a corresponding geographic range for the indicated key geographic location point according to the configuration instruction;
receive an association instruction that is fed back by the user for each indicated key geographic location point, an association relationship between the location change rule characterized by at least one of entering and leaving the geographic range corresponding to the key geographic location point and the corresponding NFC card to be activated being indicated in the association instruction; and
associate the corresponding NFC card with the indicated position change rule according to the association instruction.

7. The computer apparatus of claim 6, wherein the processor is further configured to:
determine a current time period, and
determine the NFC card associated with the preset location change rule corresponding to the current time period.

8. The computer apparatus of claim 7, wherein the processor is further configured to:
trigger the detection according to at least one of an activity feature of the user and a preset time feature, and obtaining information of a geographic location in which the user is currently located; and
determine a change of the geographic location of the user according to the information of the geographic location obtained in a previous detection and the information of the geographical location obtained in a present detection.

9. The computer apparatus of claim 6, wherein the processor is further configured to:
trigger the detection according to at least one of an activity feature of the user and a preset time feature, and obtaining information of a geographic location in which the user is currently located; and
determine a change of the geographic location of the user according to the information of the geographic location obtained in a previous detection and the information of the geographical location obtained in a present detection.

10. A non-transitory computer-readable storage medium having stored therein instructions that, when executed by a processor of a mobile terminal, causes the mobile terminal to perform a method for activating a Near Field Communication card, the method comprising:
detecting a geographical location of a user; and
in response to detecting that a change of the geographic location conforms to a preset location change rule, determining and activating, among a plurality of Near Field Communication (NFC) cards of the user each associated with at least one location change rule, an NFC card associated with the preset location change rule,
wherein the preset location change rule is configured to characterize at least one of entering and leaving a preset geographic range;
the method further comprising:
collecting a plurality of historical motion trajectories of a same user;
extracting at least one key geographic location point from the historical motion trajectories; and
determining the preset geographic range and determining an association relationship between the preset location change rule and the NFC card according to the extracted at least one key geographical location point;

wherein the determining the preset geographic range and determining the association relationship between the preset location change rule and the NFC card according to the extracted at least one key geographical location point comprises:

outputting information of the at least one key geographical location point;

receiving a configuration instruction that is fed back by the user for the output information, the at least one key geographical location point and a geographic range corresponding to each key geographical location point being indicated in the configuration instruction;

determining, according to the configuration instruction, a corresponding geographic range for the indicated key geographic location point;

receiving an association instruction that is fed back by the user for each indicated key geographic location point, an association relationship between the location change rule characterized by at least one of entering and leaving the geographic range corresponding to the key geographic location point and the corresponding NFC card to be activated being indicated in the association instruction; and associating the corresponding NFC card with the indicated location change rule according to the association instruction; or wherein the determining the preset geographic range and determining the association relationship between the preset location change rule and the NFC card according to the extracted at least one key geographical location point comprises at least one of:

determining, from the extracted at least one key geographical location point, the key geographical location point that needs to use the NFC card according to a history record of using the NFC card by the user;

determining, for each of the key geographical location points on different motion trajectories that need to use the NFC card, card information of the corresponding NFC card to be used at a next geographic location point to be arrived after leaving the geographic range corresponding to the key geographical location point according to an order of arrival of the key geographical location points that need to use the NFC card on the motion trajectories, and determining the NFC card corresponding to the determined card information as the NFC card associated with the location change rule characterized by leaving the geographic range corresponding to the key geographical location point; and determining, for each of the key geographic location points on the different motion trajectories that need to use the NFC card, the card information of the corresponding NFC card to be used at the key geographic location point, and determining the NFC card corresponding to the determined card information as the NFC card associated with the location change rule characterized by entering the geographic range corresponding to the key geographic location point.

\* \* \* \* \*